(12) United States Patent
Cesari et al.

(10) Patent No.: US 10,648,849 B2
(45) Date of Patent: May 12, 2020

(54) WEIGHING APPARATUS AND METHOD FOR A FILLING LINE FOR FILLING CONTAINERS OF PHARMACEUTICAL, MEDICAL, FOOD PRODUCTS AND THE LIKE

(71) Applicant: I.M.A. INDUSTRIA MACCHINE AUTOMATICHE S.P.A., Ozzano dell'Emilia (IT)

(72) Inventors: Alessandro Cesari, Castenaso (IT); Stefano Colautti, Massa Lombarda (IT); Massimo Landini, Imola (IT)

(73) Assignee: I.M.A. INDUSTRIA MACCHINE AUTOMATICHE S.P.A. (IT)

( * ) Notice: Subject to any disclaimer, the term of this patent is extended or adjusted under 35 U.S.C. 154(b) by 213 days.

(21) Appl. No.: 15/568,196

(22) PCT Filed: Apr. 19, 2016

(86) PCT No.: PCT/IB2016/052221
§ 371 (c)(1),
(2) Date: Oct. 20, 2017

(87) PCT Pub. No.: WO2016/170474
PCT Pub. Date: Oct. 27, 2016

(65) Prior Publication Data
US 2018/0106661 A1 Apr. 19, 2018

(30) Foreign Application Priority Data
Apr. 21, 2015 (IT) .................. MI2015A0569

(51) Int. Cl.
*G01G 13/00* (2006.01)
*G01G 17/00* (2006.01)
(Continued)

(52) U.S. Cl.
CPC ........... *G01G 13/003* (2013.01); *G01G 17/00* (2013.01); *G01G 21/286* (2013.01); *G01G 23/01* (2013.01); *G01G 23/14* (2013.01)

(58) Field of Classification Search
CPC .... G01G 13/003; G01G 17/00; G01G 21/286; G01G 23/01; G01G 23/14
See application file for complete search history.

(56) References Cited

U.S. PATENT DOCUMENTS 3,720,276 A * 3/1973 Banks ....................... B65B 1/34
177/122
4,666,005 A * 5/1987 Komoto ............... G01G 21/286
177/180
(Continued)

FOREIGN PATENT DOCUMENTS

| CN | 202039613 U | 11/2011 |
|---|---|---|
| CN | 202080442 U | 12/2011 |

(Continued)

*Primary Examiner* — Randy W Gibson
(74) *Attorney, Agent, or Firm* — Laubscher & Laubscher, P.C.

(57) ABSTRACT

A weighing apparatus for a filling line for filling containers of pharmaceutical, medical, food products and the like includes a weighing unit and a suction unit designed to generate a suction air flow directed and adjusted in such a way as to affect in a controllable manner the value of a weight detected by the weighing unit.

17 Claims, 5 Drawing Sheets

(51) Int. Cl.
*G01G 21/28* (2006.01)
*G01G 23/01* (2006.01)
*G01G 23/14* (2006.01)

(56) References Cited

U.S. PATENT DOCUMENTS

| | | | | |
|---|---|---|---|---|
| 5,422,554 A * | 6/1995 | Rohde | ............... | B25J 15/0616 |
| | | | | 318/568.21 |
| 6,166,336 A * | 12/2000 | Odiet | ............... | G01L 1/2243 |
| | | | | 177/154 |
| 6,881,907 B2 * | 4/2005 | Winkelmolen | ...... | B65G 47/766 |
| | | | | 177/145 |
| 6,987,228 B1 * | 1/2006 | MacMichael | .......... | G01G 13/06 |
| | | | | 141/83 |
| 7,893,368 B2 * | 2/2011 | Yamamoto | ........... | B41J 2/04506 |
| | | | | 141/83 |
| 8,704,111 B2 * | 4/2014 | Tanaka | ............... | B25J 15/0616 |
| | | | | 177/245 |
| 2018/0156658 A1 * | 6/2018 | Landini | ............... | G01G 17/00 |

FOREIGN PATENT DOCUMENTS

| | | | |
|---|---|---|---|
| CN | 103575613 A | 2/2014 | |
| DE | 20215794 U1 | 2/2004 | |
| DE | 102004053443 B3 | 5/2006 | |
| EP | 2273241 A1 | 1/2011 | |
| JP | 2000238728 A | 9/2000 | |

* cited by examiner

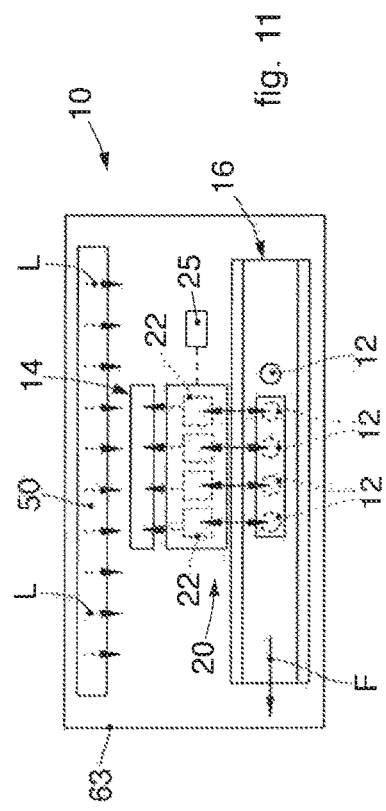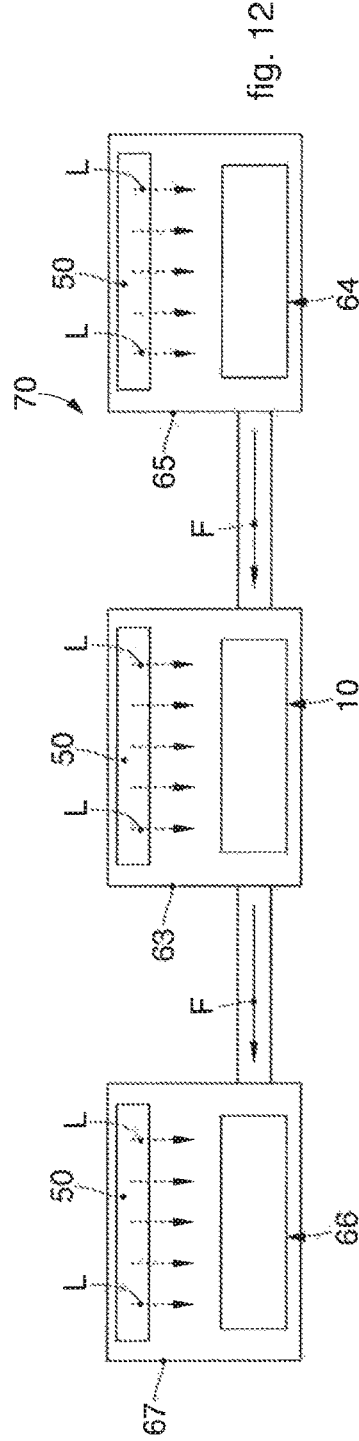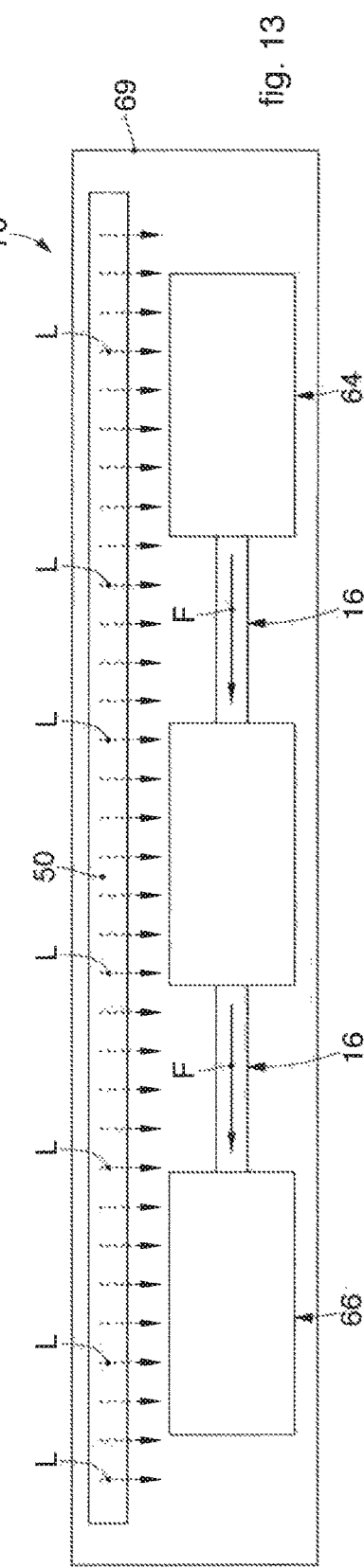

WEIGHING APPARATUS AND METHOD FOR A FILLING LINE FOR FILLING CONTAINERS OF PHARMACEUTICAL, MEDICAL, FOOD PRODUCTS AND THE LIKE

CROSS REFERENCE TO EARLIER APPLICATION

This application is a § 371 National Stage Entry of PCT/IB2016/052221 filed Apr. 19, 2016 entitled "Weighing Apparatus and Method for a Filing Line for Filling Containers of Pharmaceutical, Medical, Food Products or Similar." PCT/IB2016/052221 claims priority to IT-MI2015A000569 filed Apr. 21, 2015. The entire content of these applications are incorporated herein by reference in their entireties.

BACKGROUND OF THE INVENTION

Embodiments described herein relate to an apparatus and method for weighing containers having various forms, for example vials, ampoules, bottles, and capsules containing various substances, for example liquids, which are more or less viscous, powders, and granules, in particular in the pharmaceutical, medical or food sectors, where there is a great need for weighing precision, accuracy and repeatability.

BRIEF DESCRIPTION OF THE PRIOR ART

It is known that an industrial line for filling containers in the pharmaceutical, medical or food sector may include, in addition to a filling operating station, a weighing apparatus for checking the quantity inserted in the containers. That applies in particular in the pharmaceutical or medical sectors, in which the quantities of product that are inserted in the containers must be weighed with extreme precision, with a tolerance of approximately a microgram. For example, incorrect weighing of a medicine may result in serious risks for the health of a patient.

It is also known that in an industrial line of the type discussed, filling and weighing operations must be performed in an essentially sterile internal environment, protected with a controlled atmosphere as far as possible free of elements that may pollute or contaminate the substance in the containers. For that purpose, in addition to protecting the perimeter of the line using screens or walls and supplying a sterile air filtering system, there is a known practice of generating a laminar air flow forced from the top down which strikes the line components and exits, owing to the pressure difference between the inside environment and the outside environment, through lower or side peripheral slits, drawing with it dust, dirt, micro-particles or any other kind of air macro- or micro-pollutants.

Among the weighing systems discussed with the above-mentioned precision requirements, it is also known that factors outside of the weighing operation may affect its precision and repeatability, for example the air surrounding the weighing apparatus, its density, its pressure or local speed. Therefore, as well as monitoring and subsequently eliminating, or reducing, via software, any intrinsic errors attributable to the weighing units, it is also necessary to consider variations due to environmental factors.

In particular, it has been found that the above-mentioned laminar air flow from the top down may generate a weight measurement error in the weighing apparatus. For example, micro-vortices or local turbulences may be generated which may invalidate the measurement. Such a measurement error can be compensated via software. However, since it is not a constant and repeatable error due to differing conditions of local laminar flow interference with the line components, even that electronic compensation may not be sufficient.

Therefore, it is necessary to improve a weighing apparatus and method for a filling line for filling containers of pharmaceutical, medical, food products and the like which can overcome at least one of the disadvantages of the prior art.

SUMMARY OF THE INVENTION

In accordance with this invention, a weighing apparatus is provided for a filling line for filling containers of pharmaceutical, medical, food products and the like, which includes at least one weighing unit and at least one suction unit designed to generate a suction air flow directed in such a way that it affects the weighing unit.

According to a possible embodiment, the above-mentioned apparatus includes a covering and protecting structure which contains and protects the at least one weighing unit and the at least one suction unit and a laminar flow generating unit designed to generate a laminar air flow in the covering and protecting structure. According to a variation of that embodiment, the suction unit and the laminar flow generating unit are designed to cause the interaction of the suction air flow and the laminar air flow at least at the at least one weighing unit.

This invention also relates to a filling line for filling containers which includes a weighing apparatus in accordance with this description, a container filling apparatus and a container closing apparatus. According to this invention, at least the weighing apparatus is protected by a covering and protecting structure and a laminar flow generating unit is provided for generating a laminar air flow in the covering and protecting structure.

This invention also relates to a weighing method for a filling line for filling containers of pharmaceutical, medical, food products or similar. The method includes:
weighing containers using one or more weighing units each equipped with one or more weighing devices;
generating a drawn or suction air flow directed in such a way as to affect the one or more weighing units.

According to possible embodiments, the method includes weighing containers in a covering and protecting structure that contains and protects the one or more weighing units, and generating a laminar air flow in the covering and protecting structure. According to such embodiments, the suction air flow and the laminar air flow interact at least at the at least one weighing unit.

According to a variant of the embodiments, the method includes processing, even depending on an expected measurement error due to the suction air flow, a signal indicating the weight detected during weighing of the containers.

In accordance with a further variation, the weighing method includes a preliminary step of weighing setup in the presence of the suction air flow and in the absence of containers in the one or more weighing units, in which the suction air flow is adjusted until all of the weighing devices supply the same weight measurement value.

This invention also relates to a method for filling containers of pharmaceutical, medical, food products or similar. The method includes:
filling the containers;
weighing the containers using one or more weighing units each equipped with one or more weighing devices;

generating a suction air flow in relation to the containers at least during weighing of the containers; and
closing the containers.

The expression "suction air flow in relation to the containers" means, for example and without limiting the scope of the invention, a suction air flow that passes near to the container weighing unit or units, or even strikes them directly, and which affects the weight value detected by the weighing unit or units.

According to this description, the filling method provides that at least the weighing of the containers is carried out in a covering and protecting structure that contains and protects the one or more weighing units and, moreover, that a laminar air flow is generated at least in the covering and protecting structure, and that suction air flow and the laminar air flow interact at least at the one or more weighing units.

These and other aspects, features and advantages of this disclosure will be better understood with reference to the following description, to the drawings. The drawings, which are integrated with and form part of this description, illustrate some embodiments of the present subject matter and, together with the description, intend to describe the principles of the disclosure.

The various aspects and features described in this description may be applied individually, where possible.

BRIEF DESCRIPTION OF THE FIGURES

These and other features of this invention will appear clear from the following description of embodiments, given by way of non-limiting example, with reference to the accompanying drawing, in which:

FIG. 11 is a schematic top plan view of a weighing apparatus according to further embodiments described herein;

FIG. 12 is a schematic top plan view of embodiments of a filling line for filling containers comprising a weighing apparatus according to embodiments described herein; and FIG. 13 is a schematic top plan view of further embodiments of a filling line for filling containers comprising a weighing apparatus according to embodiments described herein.

For easier understanding, identical reference numerals have been used, where possible, to identify identical common elements in the figures. It shall be understood that elements and characteristics of one variation may be appropriately incorporated in other variations without further clarification.

DETAILED DESCRIPTION

Embodiments described herein relate to a weighing apparatus 10 for a filling line 70 for filling containers 12 of pharmaceutical, medical, food products or similar.

Figure 1:
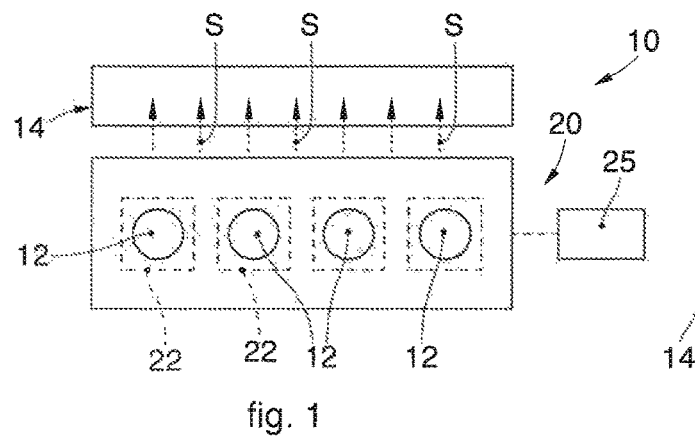
FIG. 1 is a schematic top plan view of a weighing apparatus according to embodiments described herein.
Figure 2:
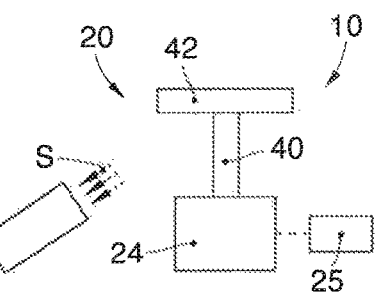
FIG. 2 is a schematic front view of a weighing apparatus according to embodiments described herein.

According to embodiments shown in FIGS. 1 and 2, and combinable with other embodiments described herein, the apparatus 10 includes at least one container weighing unit 20 and at least one suction unit 14 designed to generate a drawn or suction air flow directed in such a way as to affect the container weighing unit 20. In the accompanying figures, the suction air flow is schematically indicated, where possible, by the dashed line arrows S. The suction air flow is directed, for example and without limiting the scope of the invention, near to the container weighing unit 20, and/or containers 12 subject to weighing, in such a way as to generate a local perturbation capable of affecting the weighing unit 20 in a controllable way, that is to say, of affecting in a controllable way the weight value detected by the weighing unit 20. It is possible to provide that the suction air flow and/or of the suction unit 14 is positioned lateral, angled or underneath, or a combination of the positions.

Further embodiments described herein relate to a weighing method for a filling line 70 for filling containers of pharmaceutical, medical, food products or similar.

In accordance with this description, the method includes:
weighing the containers 12 using one or more weighing units 20;
generating a suction air flow directed in such a way as to affect the one or more weighing units in a controllable way, at least during weighing of the containers 12.

Figure 3:
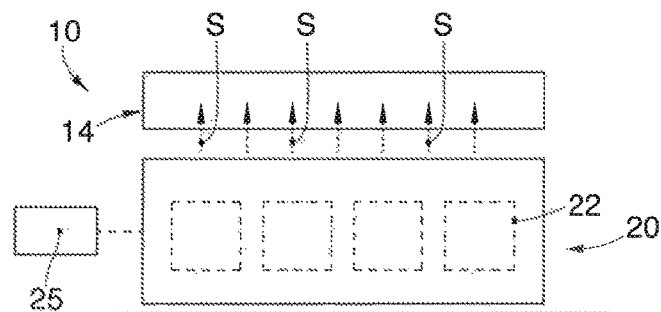
FIG. 3 is a schematic top plan view of a weighing apparatus according to further embodiments described herein.
Figure 4:
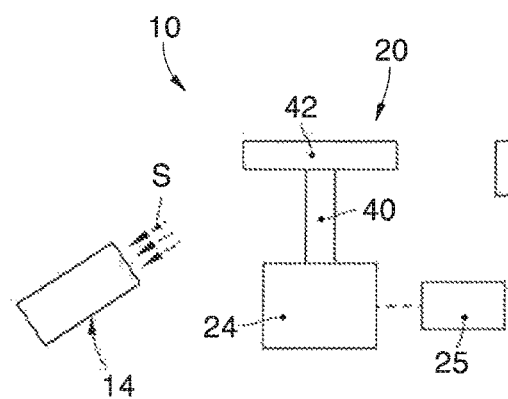
FIG. 4 is a schematic front view of a weighing apparatus according to further embodiments described herein.

According to embodiments described using FIGS. 3 and 4, and combinable with other embodiments described herein, the apparatus 10 also includes a container advancing device 16. Therefore, in accordance with further embodiments described herein, the method may also include advancing the containers.

In possible embodiments, combinable with all of the embodiments described herein, the container advancing device 16 is designed to cause at least one row of containers 12 to advance, conveying them along an advancing direction F. Examples of a container advancing device 16 usable in the embodiments described herein may be a conveying device, in particular a closed loop belt conveyor, a closed loop band conveyor belt, a supporting surface, or table, movable by a linear motor, a band or belt for conveying inside a filling line 70 for filling pharmaceutical, medical or food containers. An actuating element may be provided for driving the container advancing device 16. The actuating element may include a driving unit designed to move the containers, which is made to operate by an energy source, for example electric current, hydraulic fluid pressure or pneumatic pressure. A driving unit like that used in association with the embodiments described herein may be a driving unit selected in a group including an electric motor, an electric stepper motor, a magnetic motor, a linear axis with a motor, a linear motor, such as a mechanical linear motor, a piezoelectric linear motor, an electromagnetic linear motor, an electromechanical motor, an electromagnet, or a gear motor, in particular a direct current gear motor. For example, motors which use electromagnetism and magnetic fields for interaction between a first part including electric windings and a second part including other electric windings, or of permanent or energised magnets, or of a conductor may be provided. In specific possible exemplary embodiments, the driving unit may be designed like a linear motor, for example a linear induction motor, a synchronous linear motor, a brushless synchronous linear motor, a homopolar linear motor, a voice coil linear motor, a tubular linear motor, or even, as indicated, a piezoelectric linear motor or an electromagnet. The actuating element may be made to operate to cause advancing and pause steps of the container advancing device 16. For example, a pause step may be provided for transferring containers 12 from the container advancing device 16 to the weighing unit 20.

In possible further embodiments described using FIGS. 2, 4, 6 and 8, combinable with all of the embodiments described herein, the container weighing unit 20 may include a container support 42 and a sensor unit 24 designed to detect a weight acting on the container support 42.

For example, and without limiting the scope of any of the embodiments, a container support 42 of the type used in the embodiments described herein may be a flat plate, a supporting disk, a small plate, a portion of the container advancing device, a container-holder, a pedestal or other support suitable for supporting the container 12.

In some embodiments given by way of non-limiting example, the sensor unit 24 may include one or more sensors for detecting the weight.

It should be noticed that one or more of the sensors included in the sensor unit 24 as used in the embodiments described herein may be at least one sensor element selected from the group including:

a force sensor or transducer, such as a load cell, for example a load cell with strain gauge, a hydraulic or hydrostatic load cell, a piezoelectric load cell, a vibrating wire load cell and a capacitive load cell; and a pressure sensor or transducer, for example of the electronic type generally used for collecting a force for measuring deformation or deviation caused by the force applied on an area, such as a sensor with piezo-resistive strain gauge, a capacitive sensor, an electromagnetic sensor, a piezoelectric sensor, an optical sensor or a potentiometric sensor.

It shall be understood that depending on the specific position of the sensor unit 24, the sensor unit may even include at least one pressure sensor and at least one force sensor, for example a load cell.

According to different implementations of the embodiments described herein, the weight on the container support 42 may be detected by one or more load cells, one or more pressure sensors or one or more other sensors, which use a strain gauge, a piezoelectric element, a piezo-resistive element, a Hall effect element, or the like. In this context, it must be considered that a pressure is the force applied per surface unit, so that depending whether one or more sensors are used such as pressure sensors or as force sensors or load cells, a conversion may have to be considered.

In accordance with possible implementations, the sensor unit 24 is independent of what applies the pressure or force. For example, the sensor does not activate, move or affect the container 12, the container support 42, or any other part or portion of the apparatus 10.

In embodiments described using FIGS. 1, 2, 2a, 2b, 3 and 4, the apparatus 10 may include one or more suction units 14 positioned near a single weighing unit 20.

In embodiments described using FIGS. 2, 2a, 2b, 5, 6, 9 and 10, the apparatus 10 may include one or more suction units 14 positioned near two weighing units 20.

In some embodiments described herein with reference to FIGS. 3, 4, 5 and 6, a weighing unit 20 may be positioned in an intermediate position between the container advancing device 16 and the suction unit 14. In other words, the suction unit 14 may be positioned in a position further outside the weighing unit 20, relative to the container advancing device 16.

In other variants, a suction unit 14 may be positioned between the weighing unit 20 and the container advancing device 16.

Figure 2A:
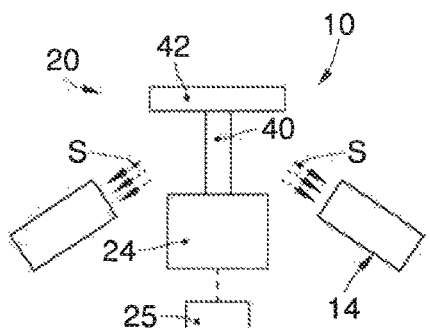
FIG. 2a is a schematic front view of a weighing apparatus according to further embodiments described herein.

In yet other variations, a weighing unit 20 may be positioned between two suction units 14 (see, for example, FIG. 2a).

Figure 2B:
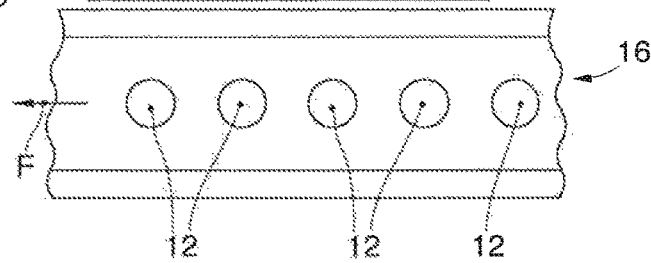
FIG. 2b is a schematic front view of a weighing apparatus according to further embodiments described herein.
Figure 2B:
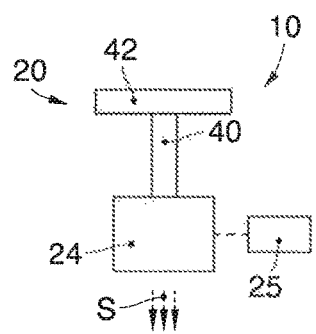

Further variations may provide for a suction unit 14 positioned underneath a respective weighing unit 20 (see, for example, FIG. 2b).

It is evident that the possible embodiments also include the possible combinations of the mutual positions described herein of one or more weighing units 20, one or more suction units 14 and the container advancing device 16.

It is also clear that the embodiments described using FIGS. 2, 2a and 2b may be used in combination with the embodiments described using FIG. 1, 3 and 4, or with the embodiments described using FIGS. 5, 6, 9 and 10.

In possible further embodiments, combinable with all of the embodiments described herein, the suction unit 14 may include one or more suction members 52, 54. A suction member usable in the embodiments described herein may include a suction pump driven by a driving unit. The driving unit may be an electric motor. In other variants, the suction member may be a Venturi effect suction member.

The suction unit 14, in particular the suction pump, or the Venturi effect suction member, may be connected to a suction duct 55 comprising a suction mouth 58, which may be positioned facing towards the containers 12 near the weighing unit 20, for generating the desired suction air flow shown by the dashed line arrows S.

Advantageously, the suction mouth 58 may be positioned below the container support 42.

The suction member may be equipped with one or more adjusting valves 62 for adjusting the suction flow, which allow control of the effect of the air flow on each weighing unit 20, that is to say, on the weight value detected by the respective sensor unit 24 of each weighing unit 20.

Basically, the suction unit 14, in particular the suction member, may be provided with one or more adjusting valves 62 designed for adjusting the suction air flow exiting through the suction mouth 58.

FIGS. 3 and 4 are used to describe further embodiments, combinable with all of the embodiments described herein, of the apparatus 10 according to this description, which may include a single weighing unit 20 positioned at the side of the container advancing device 16 and in which the suction unit 14 includes a single suction member 52, or 54, positioned close to the single weighing unit 20. For example, what may be used also for other embodiments described herein, the single suction member 52, 54 may be positioned aligned at the side of the weighing unit 20, or in a lateral and lower position relative to it (see, for example, FIG. 4).

Figure 5:
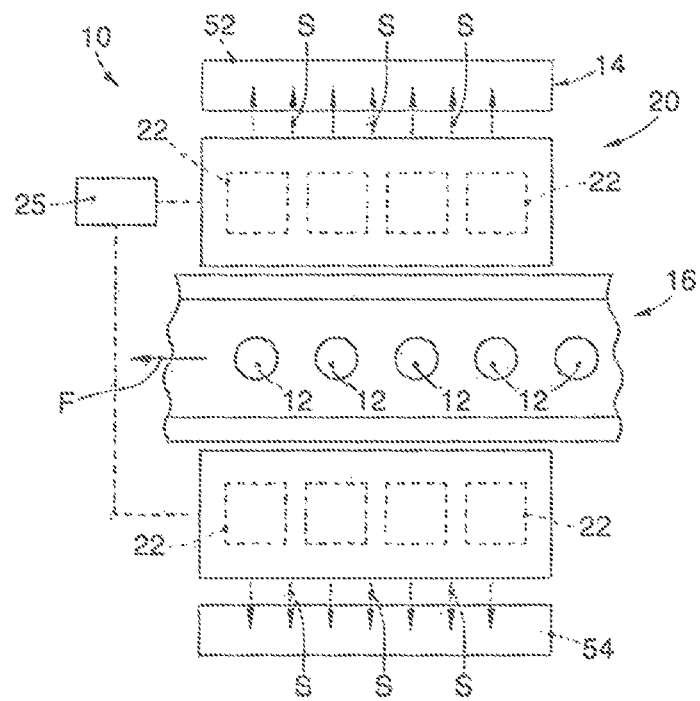
FIG. 5 is a schematic top plan view of a weighing apparatus according to further embodiments described herein.
Figure 6:
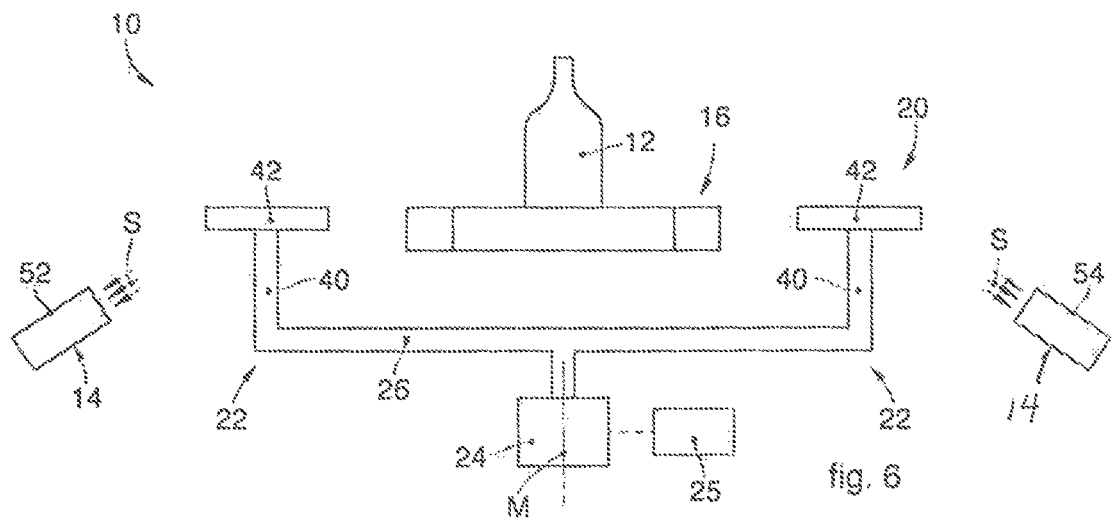
FIG. 6 is a schematic front view of a weighing apparatus according to still further embodiments described herein.

FIGS. 5 and 6 are used to describe further embodiments, combinable with all of the embodiments described herein, of the apparatus 10 according to this description, which may include two weighing units 20 positioned on opposite sides of the container advancing device 16, on one side and on the other side with respect to the advancing direction F and two suction members 52, 54 positioned close to a respective weighing unit 20.

Figure 7:
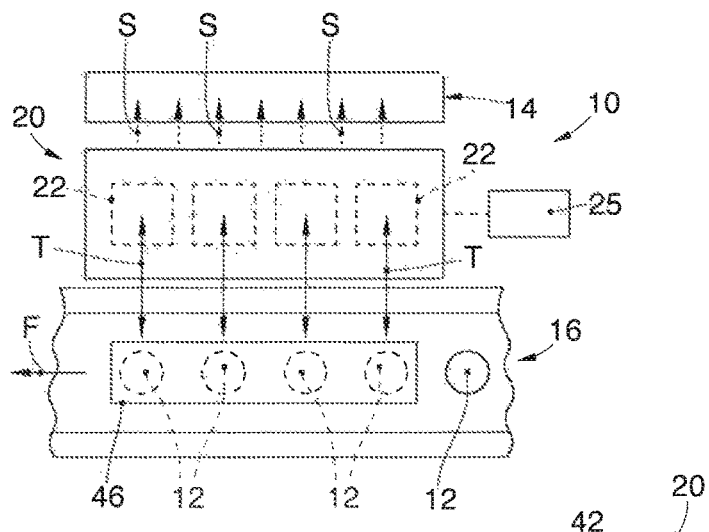
FIG. 7 is a schematic top plan view of a weighing apparatus according to further embodiments described herein.
Figure 8:
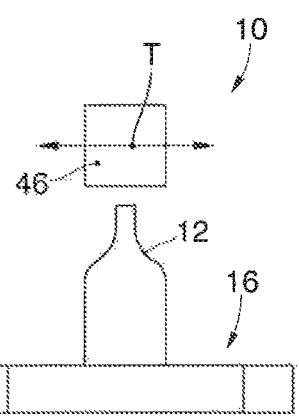
FIG. 8 is a schematic front view of a weighing apparatus according to further embodiments described herein.

According to further embodiments described herein using FIGS. 7 and 8, and combinable with other embodiments described herein, the apparatus 10 may also include a container transferring device 46, designed to transfer the containers 12 from the container advancing device 16 to the weighing unit 20 and vice versa, along a transferring direction T. Therefore, in accordance with further embodiments described herein, the method may also include a transfer of the containers from the advancing direction F to a weighing zone. The weighing zone is where the weighing unit 20 is positioned. For example, the weighing zone may be at a side of the container advancing device 16. The transferring direction T may, therefore, be transversal, for example orthogonal, to the above-mentioned advancing direction F.

It is also clear that the embodiments described using FIGS. 7, 8 may be used in combination with the embodiments described using FIGS. 1, 2, 2a, 2b, 3 and 4, or with the embodiments described using FIGS. 5, 6, 9 and 10.

Figure 9:
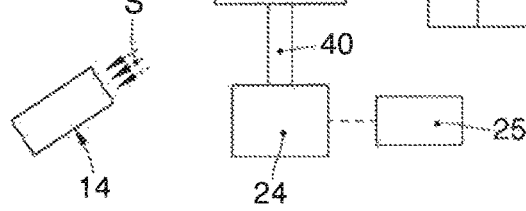
FIG. 9 is a front view in cross-section of part of a weighing apparatus according to still further embodiments described herein.
Figure 9:
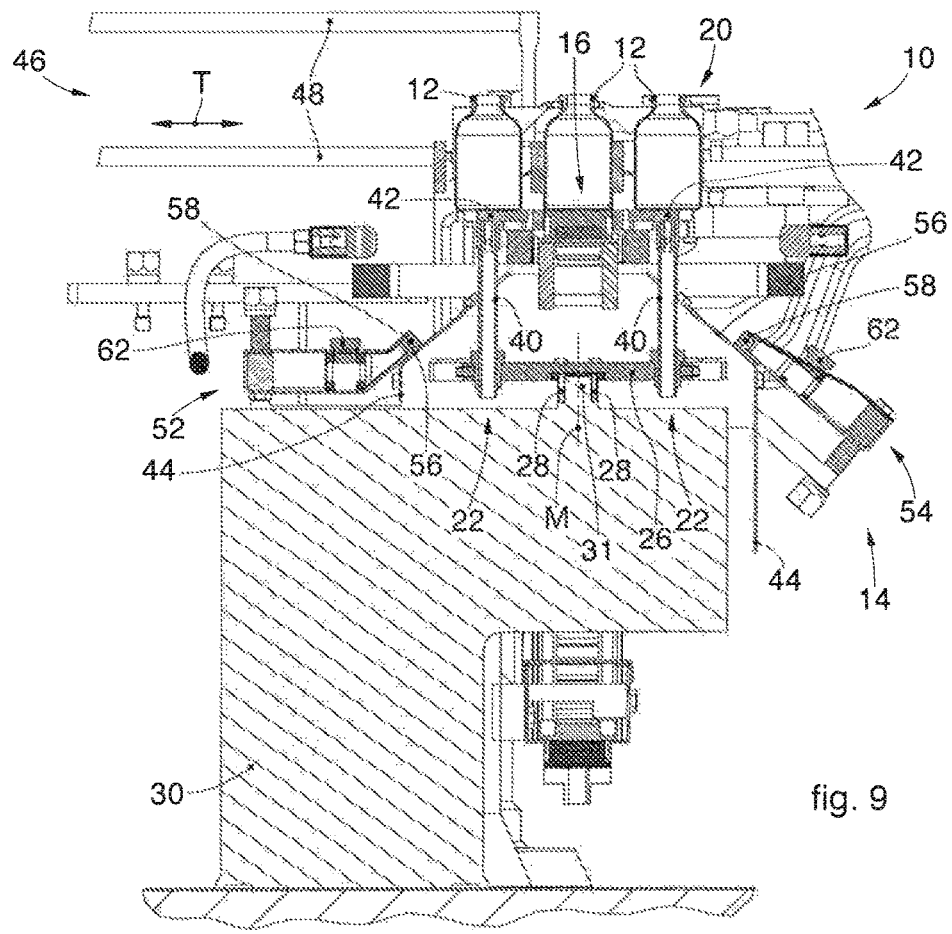
Figure 10:
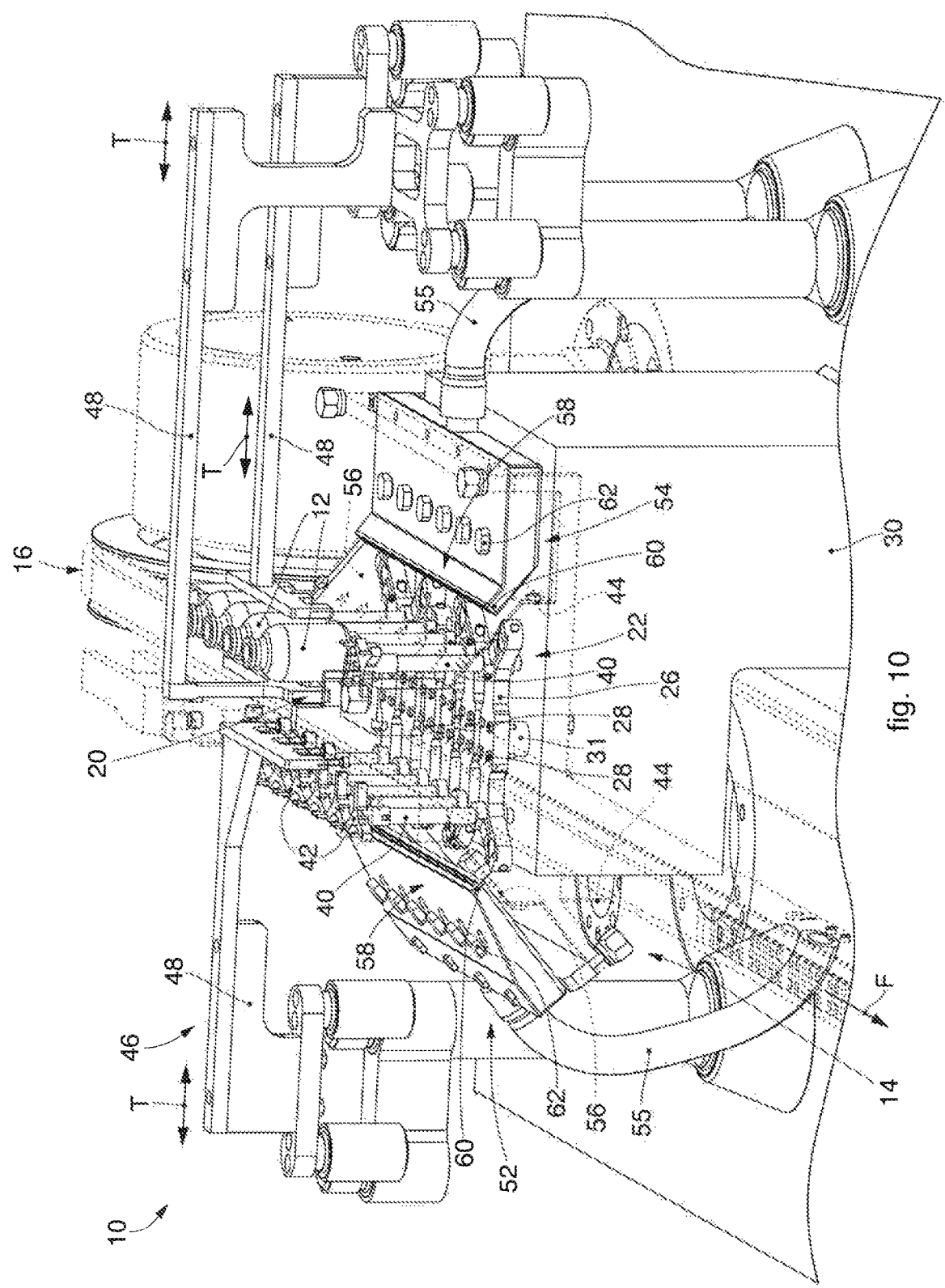
FIG. 10 is a perspective view partly in cross-section of a weighing apparatus according to further embodiments described herein.

According to embodiments described using FIGS. 9 and 10, and combinable with the embodiments of FIGS. 7 and 8, the container transferring device 46 may include one or more transferring members, or arms 48 which are selectively movable. In accordance with this invention, FIGS. 9 and 10 are used to describe further embodiments, combinable with all of the embodiments described herein, of the weighing apparatus 10 discussed, which may be included in a filling line 70 that includes a container filling apparatus 64 and a container closing apparatus 66 (see, for example, FIGS. 12 and 13). In accordance with the embodiments described herein, in the weighing unit 20 weight checks may be carried out on 100% of the containers 12, or on a sample number of containers 12, based on any statistical analysis application. For example, the containers 12, after having been filled by the container filling apparatus 64, are conveyed by the container advancing device 16 to the weighing unit 20.

In possible implementations, a weighing unit 20 usable in the embodiments described herein includes one or more weighing devices, or scales, 22 each of which is provided for checking the weight of a specific container 12.

Each weighing device 22 includes the above-mentioned container support 42, a sustaining rod 40 suitable for sustaining the container support 42 and the above-mentioned sensor unit 24. The sensor unit 24 may be dedicated to each weighing device 22, or it may be shared between coordinated pairs of weighing devices 22, for example which are positioned aligned on one side and the other side of the container advancing device 16, transversally to the advancing direction F (see, for example, FIG. 6). Therefore, the sensor unit 24 may serve both a weighing device 22 of a weighing unit 20 on one side of the container advancing device 16 and a homologous and aligned other weighing device 22 of the other weighing unit 20 positioned on the opposite side. In contrast, within the same weighing unit 20, each weighing device 22 is served by its own sensor unit 24, that is to say, there is no sharing of a sensor unit 24 between weighing devices 22 belonging to the same weighing unit 20.

For example, in the embodiments in which there are two weighing devices 22 belonging one to a weighing unit 20 and one to another weighing unit 20, positioned aligned on one side and the other side of the container advancing device 16, transversally to the advancing direction F, there is a supporting element 26, positioned transversally to the advancing direction F of the container advancing device 16, which supports the sustaining element 40 and the container support 42 (see, for example, FIG. 6).

The supporting element 26 has an axis of symmetry M and the respective sustaining elements 40 and container support 42 are located in positions symmetrical with respect to the axis of symmetry M. The axis of symmetry M may advantageously be located at the longitudinal center line of the container advancing device 16, that is to say, at the advancing direction F.

As shown, for example, in FIGS. 1, 3, 5 and 6, in possible embodiments, each weighing unit 20 may therefore be equipped with respective rows of weighing devices 22. Therefore, overall, there are opposite rows of weighing devices 22, on one side and the other side of the container advancing device 16, positioned between the above-mentioned suction members 52, 54.

The weighing apparatus 10 also includes a supporting structure 30 (see, for example, FIGS. 9 and 10).

Fixing pins 28 are used for fixing, in particular on one side and the other side of the above-mentioned axis of symmetry M, the horizontal supporting element 26 to a supporting element 31, for example a longitudinal supporting bar, of the supporting structure 30.

In possible variations, the supporting structure 30 is designed to reduce and if necessary neutralize possible vibrations that could invalidate weighing.

In accordance with further possible embodiments, the weighing unit 20 may include a covering element, or protective guard, 44 (see, for example, FIGS. 9 and 10) suitable for protecting the weighing devices 22, leaving uncovered and accessible only the container supports 42, thereby protecting against any dust particles or foreign bodies, or even against the substance to be inserted in the vial, which may significantly affect the weight detected.

In accordance with further possible embodiments, the covering element 44 includes lateral walls 56, for example angled downwards with respect to the container supports 42 in such a way as to guide the suction air flow indicated by the dashed line arrows S.

In particular, for that purpose, the first suction member 52 and the second suction member 54 are positioned in contact on the lateral walls 56, in such a way that the respective suction mouths 58 are facing towards the container supports 42, or at a zone below them towards the sustaining element 40.

Advantageously, the suction mouth 58 of each suction member 52, 54 extends along the entire length of the row of container supports 42 belonging to a respective weighing unit 20. Therefore, each container support 42 is subject to the suction air flow, which affects the respective weighing device 22 in a controllable way.

In accordance with embodiments, the suction mouth 58 may be divided into two or more suction sectors, each of which is suitable for generate a respective suction air flow, which may be associated with a respective container support 42, in such a way that each container support 42 is subject to a respective suction air flow, which affects the respective weighing device 22. Each suction sector may include its own suction nozzle 60.

In accordance with further embodiments, the suction air flow is selectively controllable using the above-mentioned adjusting valves 62, in such a way as to create a suction air flow that affects all the container supports 42 included in the weighing device 22. Each suction nozzle 60 may be connected to its own adjusting valve 62, in such a way as to adjust the suction air flow affecting each container support 42 independently of the suction air flows affecting the other container supports 42. In this way, it is possible to adjust the suction air flows in such a way that each weighing device 22 is affected by the respective suction air flow differently and independently of the other weighing devices 22.

FIG. 11 is used to describe further possible embodiments, combinable with the embodiments previously described, in which the weighing apparatus 10 includes a covering and protecting structure 63, which contains and protects one or more weighing units 20 and the respective one or more suction units 14, and the container advancing device 16 and container transferring device 46 if any.

In this way, advantageously, the weighing apparatus 10 may be isolated from the outside environment to obtain a controlled atmosphere. The covering and protecting structure 63 may be made using a suitable protective material, for example glass, polymer, metal or any other suitable material.

The weighing apparatus 10 may also include a laminar flow generating unit 50 designed for generating a controlled laminar air flow L inside the covering and protecting structure 63, which usually travels from the top down, exploiting the pressure difference between the inside environment and the outside environment (see, for example, FIG. 11).

Therefore, according to this description, the laminar air flow generated by the laminar flow generating unit 50 strikes from the top down one or more weighing units 20, in particular the surface of the container supports 42, whether they are empty or occupied by a container 12.

That flow allows the creation of a controlled atmosphere in the covering and protecting structure associated with the weighing apparatus 10. However, as discussed above, it may also generate unwanted local micro-turbulences close to the one or more weighing units 20, and therefore measurement errors which may be unforeseeable.

Basically, one or more weighing units 20 disturb the air flow L, in particular they upset the laminar nature of the air flow L, to the extent that at the weighing units 20, turbulences and/or vortices are generated which affect negatively, and in an unrepeatable way, the measurement values of the weight of the containers 16. The turbulences and/or vortices may, for example, act negatively on the container supports 42.

The apparatus 10 and method according to this description overcome the disadvantage thanks to the generation of the above-mentioned suction air flow locally at the one or more weighing units 20. The suction air flow generates a local perturbation whose extent is known and repeatable. It does not matter if the turbulences and/or vortices caused by the suction air flow generate a systematic measurement error whose absolute value is greater than or less than the measurement error that would occur in the absence of the suction air flow. What does matter is that the suction air flow, together with the laminar air flow L, generates a highly repeatable error and therefore an error that can substantially be eliminated, for example using software.

Advantageously, it is possible to generate a suction air flow such as to reduce, or even cancel out, the turbulences and/or vortices present at, and caused by, the container supports 42, so as to restore the laminar air flow L, even at the container supports 42.

Advantageously, the above-mentioned suction unit 14 and the above-mentioned laminar flow generating unit 50 are designed to cause the suction air flow and the laminar air flow interact at least at the one or more weighing units 20.

It is, therefore, believed that the effect caused locally by the laminar air flow L, combined with the suction air flow, generates a perturbation on the weighing unit, in particular on the container support 42, which introduces an error that may be predefined and is repeatable, and as such, manageable, that is to say eliminable, for example using software, with repeatability and reliability, whatever the absolute value of that error is. For that purpose, there is a control unit, or system controller 25, which receives a weight signal detected by each sensor unit 24. The control unit 25 is designed to process, using software, the signal received, even depending on the expected measurement error due to the above-mentioned suction air flow. It was found that in this way overall, detection of the weight of filled containers 12 is more reliable, that is to say, more precise and accurate.

In embodiments, the method described herein may include a weighing setup preliminary step in the presence of the suction air flow and in the absence of containers 12 in the one or more weighing units 20. That is to say, a no-load weighing setup preliminary step is performed on the weighing devices 22, adjusting the suction air flow until all of the weighing devices 22 "with no load" supply the same weight measurement value. In detail, in the absence of containers 12, the amount of the suction air flow is controlled, in particular adjusting the adjusting valves 62, so that all the weighing devices 22 present give the same weight measurement in the presence of the desired suction air flow. Therefore, by the weighing setup preliminary step, the generation and control of suction is carried out in such a way that, in the absence of containers 12 in the weighing units 20, all the weighing devices 22 produce identical weight measurements. Such weight measurements, with "no load" and in the presence of the suction air flow, are used as a reference for all the measuring devices 22. In possible implementations, the weight value given by the weighing devices 22, in the absence of containers 12 and in the presence of the suction air flow, is managed using software in the measurement of the weight of the containers 12 by the above-mentioned control unit 25, in particular, for example, by subtracting it from the weight measurement performed on the containers 12.

Advantageously, the method according to the invention may include the weighing setup preliminary step in the presence of the laminar air flow L and the suction air flow, and in the absence of containers 12 in the one or more weighing units 20.

The weighing setup preliminary step may be simultaneous with, or subsequent to, the start of generation of the suction air flow and in any case precedes weighing of the containers 12, in particular preceding the positioning of the containers 12 to be weighed on the respective container supports 42. For example, in variations of the method according to this description, initially the suction air flow is generated in the absence of containers 12 in one or more weighing units 20, then the weighing setup preliminary step is performed in the absence of the containers 12, adjusting the suction air flow generated, followed by weighing of the containers 12 maintaining, during the weighing, the suction air flow generated and already adjusted during the weighing setup preliminary step.

In possible embodiments of the method according to this description, to take into account possible effects on the container supports 42 "with no load", that is to say, when they are not occupied by containers 12, due to the suction air flow which, in a desired way, locally disturbs the system, the weighing setup preliminary step may include essentially zeroing one or more weighing units 20, before they are occupied by the containers 12 to be weighed, that is to say, when the container supports 42 are still empty. The term "zeroing" means that the weight value measured "with no load" by the one or more weighing units 20, in particular by one or more sensor units 24, is advantageously set, by the above-mentioned control unit 25, equal to zero, subject to the tolerances linked to the precision of the instrument.

This zeroing step allows the setting of a condition of zero weight detected by one or more sensor units 24 relating to a condition in which the suction air flow is present. In other words, all of the sensor units 24 are set to a reference "zero" condition which takes into account the effects of the suction air flow on the empty container supports 42, that is to say, not occupied by the containers 12. Therefore, in this variant, essentially the common weight value that the weighing devices 22 provide following the weighing setup preliminary step, in which the suction air flow is suitably adjusted, is equal to zero. The control unit, or system controller 25 may include a central processing unit, or CPU, an electronic memory, an electronic database and auxiliary circuits (or I/O) (not illustrated). For example, the CPU may be any type of computer processor usable in the computer science sector for automation and control. The memory may be connected to the CPU and may be one or more of those commercially available, such as a random access memory (RAM), a read only memory (ROM), a floppy disk, a hard drive, a mass storage device, or any other type of digital, local or remote storage. The software instructions and the data may, for example, be coded and saved in the memory for controlling the CPU. Even the auxiliary circuits may be connected to the CPU, for helping the processor in a conventional way. The auxiliary circuits may include, for example, at least one of the following: cache circuits, power circuits, clock circuits, input/output circuitry, sub-systems, and the like. A program (or computer instructions) that can be read by the control unit 25 can determine which tasks can be performed in accordance with the method according to this description. In some embodiments, the program is software that can be read by the control unit 25. The control unit 25 includes a code for generating and saving information and data entered or generated during the method according to this description.

FIGS. 12 and 13 are used to describe embodiments of a filling line 70 which may include a weighing apparatus 10 according to this description.

In particular, the filling line 70 may include a container filling apparatus 64, the weighing apparatus 10 and a container 12 closing apparatus 66. The above-mentioned container advancing device 16 may be designed to serve sequentially the container filling apparatus 64, the weighing apparatus 10 and the container closing apparatus 66 along the advancing direction F.

In the embodiments of the filling line 70 described using FIG. 12, dedicated covering and protecting structures for each line component are provided. In particular, the container filling apparatus 64 and the container closing apparatus 66 are protected by respective covering and protecting structures 65, 67, just as the weighing apparatus 10 is protected by the above-mentioned covering and protecting structure 63 described using FIG. 11. Advantageously, the transit of the containers 12 from one to the other of the apparatuses 64, 10 and 66 may be performed using protected conveying and transporting systems. Moreover, even each of the covering and protecting structures 65, 67 may be associated with a respective laminar flow generating unit 50, with operation similar to what has been described above.

In the embodiments of the filling line 70 described using FIG. 13, there is a single covering and protecting structure 69 for the entire line, that is to say, which contains and protects the container filling apparatus 64, the weighing apparatus 10 and the container closing apparatus 66. In that case, a single laminar flow generating unit 50 may be provided.

It is evident that the weighing apparatus 10 and method described above may be subject to changes and/or additions to parts and/or steps without thereby departing from the scope of the present invention.

It is also evident that, although this invention has been described with reference to some specific examples, a skilled person will certainly be able to produce many other equivalent forms of the weighing apparatus, and therefore all covered by the limits of protection defined by them.

Although what has been described above refers to embodiments of the invention, other and further embodiments are possible, without thereby departing from its main limits of protection, and the related scope of protection.

The invention claimed is:

1. A weighing apparatus for a filling line for filling containers of pharmaceutical, medical, food products, comprising:
    at least one weighing unit including at least one weighing device including at least one container support and at least one sensor unit which detects a value of a weight force acting on the container support; and
    at least one suction unit which generates a suction air flow that is directed and adjusted in such a way as to controllably affect the value of said weight force detected by said at least one sensor unit;
    a container advancing device which moves the containers along an advancing direction and a container transferring device which transfers the containers between said container advancing device and said at least one weighing unit, respectively.

2. The weighing apparatus as defined in claim 1, and further comprising
    a covering and protecting structure which contains and protects said at least one weighing unit and said at least one suction unit; and
    a laminar flow generating unit which generates a laminar air flow within said covering and protecting structure.

3. The weighing apparatus as defined in claim 2, wherein said suction unit and said laminar flow generating unit are configured to cause the interaction of said suction air flow and said laminar air flow at least at said at least one weighing unit.

4. The weighing apparatus as defined in claim 1, wherein said at least one weighing unit is positioned in an intermediate position between said container advancing device and said at least one suction unit.

5. The weighing apparatus as defined in claim 1, wherein said at least one weighing unit comprises a plurality of weighing devices.

6. The weighing apparatus as defined in claim 1, and further comprising a suction duct connected with said at least one suction unit, said suction duct including a suction mouth positioned below the container support.

7. The weighing apparatus as defined in claim 6, wherein said at least one suction unit includes an adjusting valve to adjust the suction air flow exiting through the suction mouth.

8. The weighing apparatus as defined in claim 1, wherein said at least one suction unit includes at least one suction member each of which is divided into a plurality of suction sectors which generate a respective suction air flow directed in such a way as to controllably affect the value of said weight force detected by a respective weighing device of said plurality of weighing devices, each of said suction sectors including an adjusting valve.

9. The weighing apparatus as defined in claim 4, wherein two weighing units are positioned opposite to each other with respect to the advancing direction of said container advancing device.

10. A weighing apparatus for a filling line for filling containers of pharmaceutical, medical, food products, comprising:
at least one weighing unit including at least one weighing device including at least one container support and at least one sensor unit which detects a value of a weight force acting on the container support;
at least one suction unit which generates a suction air flow that is directed and adjusted in such a way as to controllably affect the value of said weight force detected by said at least one sensor unit;
and
a covering element to protect at least said at least one weighing unit and said at least one suction unit.

11. A filling line for filling containers, comprising
a weighing apparatus including
at least one weighing unit including at least one weighing device including at least one container support and at least one sensor unit which detects a value of a weight force acting on the container support; and
at least one suction unit which generates a suction air flow that is directed and adjusted in such a way as to controllably affect the value of said weight force detected by said at least one sensor unit;
a container filling apparatus;
a container closing apparatus; and
a covering and protecting structure protecting at least said weighing apparatus and including a laminar flow generating unit.

12. A weighing method for a filling line for filling containers of pharmaceutical, medical, food products, comprising the steps of
weighing the containers with at least one weighing unit each equipped with at least one weighing device; and
generating a suction air flow directed and adjusted to controllably affect the value of a weight detected by said at least one weighing device,
wherein said weighing step occurs within a covering and protecting structure that contains and protects said at least one weighing unit on which the containers to be weighed are placed, and further comprising the step of generating a laminar air flow in said covering and protecting structure, said suction air flow and said laminar air flow interacting at least at said at least one weighing unit.

13. The method as defined in claim 12, and further comprising a preliminary step of calibrating said at least one weighing devices in the presence of said suction air flow and in the absence of containers in the at least one weighing unit by adjusting the suction air flow until all of the weighing devices provide the same weight measurement value.

14. The method as defined in claim 13, and further comprising the step of processing a signal indicating the weight detected during weighing of the containers in accordance with said weight measurement value.

15. The method as defined in claim 12, and further comprising a preliminary step of calibrating said at least one weighing devices in the presence of said suction air flow and in the absence of containers in the at least one weighing unit wherein all the weighing devices are set up to set the weight value detected by each weighing device equal to zero.

16. The method as defined in claim 12, and further comprising a preliminary step of calibrating said at least one weighing devices in the presence of said laminar air flow and said suction air flow and in the absence of containers in the at least one weighing unit wherein all the weighing devices are set up to set the weight value detected by each weighing device equal to zero.

17. The method as defined in claim 12, and further comprising the steps of
filling the containers before said weighing step;
closing the containers, and wherein at least said weighing step occurs within a covering and protecting structure that contains and protects said at least one weighing unit; and
generating a laminar air flow at least in said covering and protecting structure, said suction air flow and said laminar air flow interacting at least at said at least one weighing unit.

* * * * *